United States Patent [19]
Catalano et al.

[11] Patent Number: 4,822,680
[45] Date of Patent: Apr. 18, 1989

[54] POLYURETHANE VISIONARY LAMINATE GLASS AND METHOD OF MANUFACTURE

[75] Inventors: Gennaro J. Catalano, Washington Crossing; Larry D. George, Bensalem, both of Pa.

[73] Assignee: American Temporing, Inc., Union City, Calif.

[21] Appl. No.: 90,530

[22] Filed: Aug. 28, 1987

[51] Int. Cl.$^4$ .......................... B32B 17/10; G02C 7/10
[52] U.S. Cl. .................. 428/425.6; 428/429; 428/432; 428/436
[58] Field of Search ...................... 428/425.6, 447, 451, 428/430, 432, 441, 426, 429, 436

[56] References Cited

U.S. PATENT DOCUMENTS 4,683,172 7/1987 LeGrand et al. ............... 428/447 X

OTHER PUBLICATIONS

EP 008134, Goepfert, Jun. 1983 from 428/425.6.

*Primary Examiner*—Nancy A. B. Swisher
*Attorney, Agent, or Firm*—John J. Simkanich

[57] ABSTRACT

A polyurethane filmed glass material for use as monolithic insulated glass or laminated glass in spandrel application is provided. Polyurethane sheet which has been ultraviolet light stabilized is pigmented, coated or otherwise colored to produce a coloring which is predictable and reproducible. A coupling agent is employed and the polyurethane adheres directly to a glass sheet without glues or adhesives.

The manufacture of the glass material includes laying a sheet of colored polyurethane sheet material on a sheet of glass which has been prepared with a coupling agent. Outside surfaces of the polyurethane are coated with a release material. The glass sheet and the prepared polyurethane sheet are then loaded into a vacuum bag which in turn is then loaded into an autoclave. The bag is subjected to a vacuum while the autoclave vessel is pressurized. The autoclave vessel is simultaneously run through a temperature curve to heat and cool the polyurethane and glass whereby the polyurethane is temporarily softened and thereby adheres to the glass. The laminated product is thereafter tempered.

13 Claims, 5 Drawing Sheets

POLYURETHANE VISIONARY LAMINATE GLASS AND METHOD OF MANUFACTURE

BACKGROUND OF THE INVENTION

This invention relates to the manufacture of colored, tinted and coated plate glass and the plate glass or spandrel product provided by such manufacture.

The invention further relates to a method of opacifing glass and the opacified glass product produced by that method.

With the evolution in modern, glass-expansive architecture, the use of glass as a structural component has increased. With this use of glass, the control of heat and light transmission through the glass has become the focus of much engineering effort. A simple, economic and efficient method of manufacturing opacified glass has always been desirable.

Ceramic frit is the oldest method of opacifing glass. It utilizes glass enamels comprised of ceramic frit that are permanently fused to the glass. The frit materials can be applied to the glass by spray, by roller, by curtain coating or by screen printing. Either the frit is colored or pigments, usually metal oxides, are added. This particulate material is suspended in a media which can vary from water to oil to any of a number of organic chemicals depending upon the selection of the method for applying the material to coat the glass surface.

Usually only one surface, the top surface, is coated at a time and then the glass is heated to fuse the material to the glass surface.

A second method for opacifing glass is to apply plastic film opacifiers. In this method an adhesive is used to adhere the plastic film to the glass. Polyproplyene and polyethylene have been used as they can be glued to glass. The polypropylene and the polyethylene polyester sheets are tinted before gluing. Heat build up, however, can cause a separation of the glued surfaces and/or a discoloration of the glue material used after the opacified glass product has been installed and subjected to ultraviolet light and heat build up from the sun. Polypropylene and polyethylene have limited uses as they are translucent and not transparent.

Another method of opacifing glass is to coat it with a colored silicone elastomer. As an example an 8-mil thickness of the silicone material is sprayed on the glass. This material contains a neutral-cure silicone sealant. The material dries at room temperatures in hours or can be oven dried in minutes. Adhesion is achieved but the silicone coating has yet to be proven in long term applications. Likewise, it is subject to abrasion damage during manufacture or construction.

A further type of opacified glass is made by vacuum deposition of metal to glass. This creates a very thin layer of material, microns thick which is very susceptible to abrasion and scratching.

Tinted polycarbonate sheet and polyvinyl butyral sheet, the PVB has a natural brown tint, have been laminated to glass using an acrylic coupling medium and a mechanical bond, respectively. These materials, however, tend to discolor over time. Further, all polycarboniates require a cross-linking agent, usually alkaline based, to etch the glass to enhance adhesion. This cross-linking bonding agent adds to the manufacturing expense.

Architectural spandrel glass has also been made by painting one side with a ceramic paint and then thermobonding the paint by heating. This type of glass also tends to discolor over time. Further, its color "hue" is difficult to control from one manufacturing run to another.

Of all the presently known laminate materials, polyurethane offers the best performance. It is more moisture proof than polycarbonate and won't discolor over time as polycarbonate does when it picks up moisture. It is crystalline and has good bondability to glass especially when a coupling agent is used. However, heretofore, polyurethane has only been successfully applied to glass as a liquid in a casting process.

The "floating" of a cast polyurethane layer on a sheet of glass has been a cumbersome and slow manufacturing process.

What is desired is an improved process for manufacturing colored or tinted spandrel glass and architectural glass whereby this glass is more easily manufactured from less costly materials.

What is also desired is an opacified glass which is more easily and more economically manufactured and which is color stable and transparency stable with time.

What is further desired is an opacified architectural glass laminate and a manufacturing process where color hue is easily stabilized between manufacturing runs.

SUMMARY OF THE INVENTION

An object of the present invention is to provide an opacified glass laminate for spandrel and other architectural applications.

A second object of this invention is to provide such an opacified glass laminate which is color and visionary stable over time in architectural applications.

Another object of this invention is to provide such an opacified glass where a polyester sheet material carrying or creating the opacification effect is laminated to glass.

Another object of this invention is to provided a manufacturing process which will easily and economically mass produce such opacified glass.

A further object of this invention is to provide such a process where the polyster laminate is polyurethane sheet material which has been treated, whereby it is caused to adhere to a glass sheet under a pressure and heat environment process and which polyurethane sheet has been treated for opacification prior to the pressure and heat treatment process.

DESCRIPTION OF THE DRAWINGS

The features, advantages and operation of the invention will better be understood from a reading of the following Detailed Description of the Invention in connection with the accompanying drawings, in which like numerals refer to like elements, and in which.

DETAILED DESCRIPTION OF THE INVENTION

Figure 1:
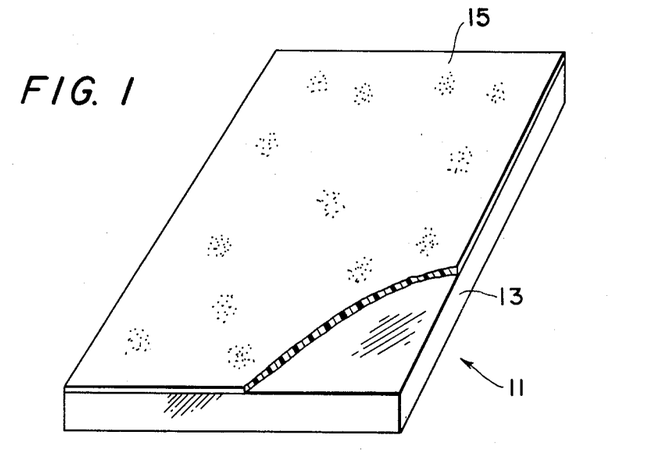
FIG. 1 is a perspective view of the opacified laminate glass of this invention.

An architectural opacified glass 11, FIG. 1, is constructed of a plate of clear glass 13 and a sheet of polyurethane film 15, which film 15 has been colored, or tinted, or coated or otherwise opacified into a visionary or non-visionary state depending upon the degree of opacification.

The film 15 adheres to the glass 13 without the use of glues or adhesives. A heat and pressure process provides a molecular bond of the polyurethane sheet film 15 to the glass plate 13.

The laminate 11, shown in FIG. 1, is useful in monolith insulated and laminated glass applications and in spandrel applications. It can also be used with double sheets of glass as a sandwich.

Figure 2:
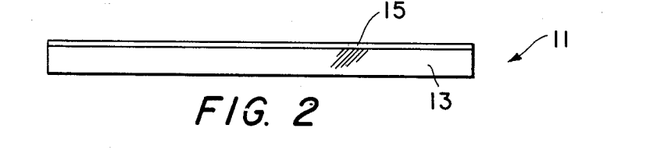
FIG. 2 is a side view of the opacified laminate glass of the inventor showing a tinted polyurethane film used.

FIG. 2 shows a sideview of the opacified laminated glass 11 with the glass plate 13 having adhered to one side thereof, the tinted polyurethane film 15. A coupling agent has been applied to the interfacing side of the glass plate 13. This coupling agent, which will be discussed below, aids in the molecular bonding of the polyurethane sheet film 15 to the glass plate 13.

As an alternative to the tinted polyurethane 15 of FIGS. 1 and 2, metal coated polyurethane 17 opacification sheet could be used. Here the plate glass 13 has bonded to it a clear sheet of polyurethane 19 which has been pre-coated on one side thereof with metal or metal oxide 21. As an alternative, a sheet of polyurethane 19 can be heat bonded to a sheet of metal 21. This laminate forms the opacification sheet 17.

Figure 3:
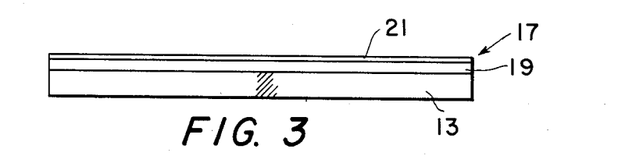
FIG. 3 is a side view of the opacified laminate glass of the invention with a non-tinted polyurethane film coated with metal.

The metal coated polyurethane film 17 (opacification sheet) has been pre-manufactured before being applied to the glass plate 13. The metal coating 21 on the clear polyurethane film 19 has been applied by vacuum deposition or other processes as will be described below. As shown in FIG. 3, this metal coated polyurethane film 17 has been applied to the plate of glass 13 with the metal coating 21 facing outwardly.

Figure 3A:
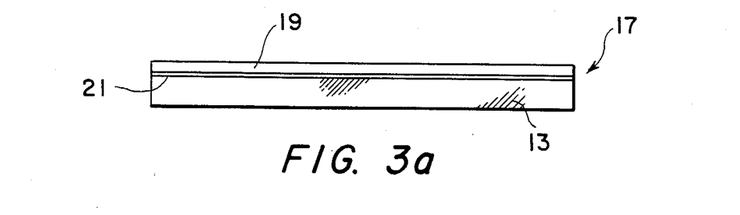
FIG. 3a is a side view of the opacified laminate glass of the invention where the polyurethane film is coated with a metal and that metal coating interfaces the glass.

As an alternative to the assembly of FIG. 3, the metal coated polyurethane film 17 can be applied to the glass plate 13 with the metal coating 21 interfacing the glass 13 and the clear side of the polyurethane film 19 facing outwardly, FIG. 3A. In this alternative assembly, a different coupling agent may be utilized than what is utilized in the assemby of FIG. 3 where the polyurethane film 19 is bonded to interface directly to the glass 13. Such different coupling agent might be 1101-F, an inorganic silane ester provided by Union Carbide.

Figure 4:
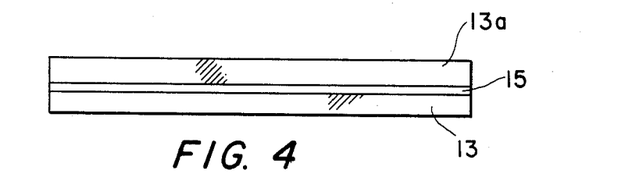
FIG. 4 is a side view of the invention showing a glass-polyurethane-glass sandwich.

A sandwich structure, FIG. 4, can be made using two sheets of clear glass plate 13 and having interposed therebetween, a sheet of polyurethane 15 which has been tinted or otherwise colored. It is understood, that the metal coated polyurethane 17 could be substituted for the tinted or colored polyurethane 15.

Polyurethane is a thermoplastic ester which is thermosetting. It is produced as a polymer unit formed as follows: RINCO+RZOH-RINHCOORZ.

Polyurethane provides a desirable structural material for glass lamination as it has a high elastic modulus, high moisture proofness, good resistance to abrasion, good weathering characteristics, and a crystalline structure.

This last physical characteristic, crystalline structure, provides a newly discovered key to the molecular bonding of polyurethane film to glass in the presence of a coupling agent under a heat and pressure process.

Further, the polyurethane can be pigmented to produce colors that remain stable and these colors can also be matched to standard color runs. The polyurethane has been ultra-violet stablized to retard discoloring.

The treated polyurethane film 15 or 17 provides the visionary (some degree of light transmission) or non-visionary (no light transmission) feature to the laminate 11. Typically, the treated polyurethane film 15 or 17 begins as a transparent (clear-100% transmission film) and is colored to provide limited light transmission, such as 8%, 28%, and 44% light transmission, as an example.

The treated polyurethane film 15 or 17 can also be applied to spandrel glass. It can be pigmented to the color desired, or it can be made opaque with metal coatings.

The treated polyurethane film 15 or 17 provides the laminated safety, color and insulating value required in architectural glass. Moreover, the polyurethane film provides a the polyurethane film provides a glueable surface for gluing most urethane based insulating materials thereto.

The polyurethane is applied to the glass utilizing a coupling agent, which includes, but is not limited to, the organoester silane group.

Thermoset polyurethane has passed the standard weather test performed by E.T.L. Laboratory, Inc.

The composite material of the glass plate 11 or 13 and the treated polyurethane film 15 or 17 is placed in an autoclave and processed under heat, pressure and vacuum to complete the cross linking of the polymer and its bonding to the glass. This process will be described in greater detail below.

Figure 5:
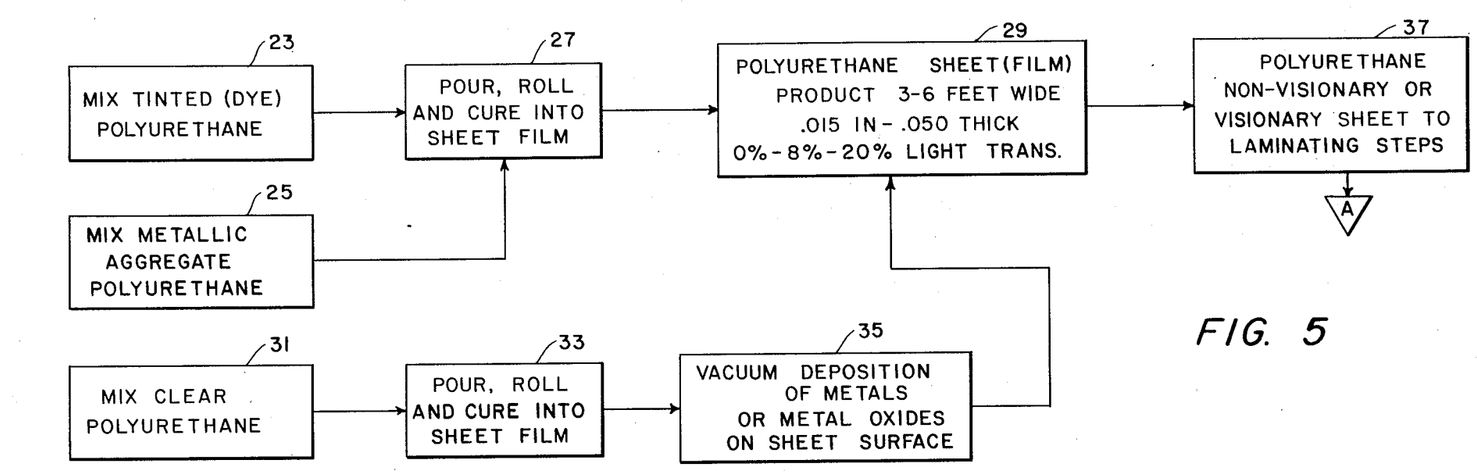
FIG. 5 is a block diagram of the tinted or metal coated polyurethane film process steps.

FIG. 5 shows the initial process steps for manufacturing the opacified polyurethane film (sheet) 15 or 17. One process for manufacturing this film includes tinting or dying the polyurethane mix 23 in the melting pot, to the desired color. As an alternative, metallic agrigate can be mixed into the polyurethane mixture 25. Following either of these process steps 23, 25 the film is poured, rolled and cured into sheet film 27. This provides the polyurethane sheet film product 15 or 17 which can be made typically from 3 to 10 feet wide, and preferably 3 to 6 feet wide, and from 0.015 inches to 0.050 inches thick. Typically, the thickness of the film is made to be either 0.015 inches, 0.025 inches or 0.050 inches.

Likewise, the light transmission depends upon the amount of dye or metallic agrigate or metal oxide deposited on the surface of the film. This light transmission typically is 8%, 14% or 20% for metal film and 8%, 28% or 44% for dyed films, to provide product 29.

As an alternative to dying the polyurethane mixture, clear polyurethane 31 can be rolled and cured into sheet film 33 and then by vacuum deposition, metal oxides or metals can be deposited on one or both sides of the polyurethane film 35. These metals can be stainless steel, copper, silver or gold and the oxides can include tin oxide.

If the metal or metal oxide layer is such that there is no light transmission, the polyurethane film is non-visionary. If the light transmission is 8%, 14% or 20%, then it is visionary. The finished polyurethane film is then sent on to the laminating steps 37, which may be carried out in the same facility as the manufacturing of the polyurethane film, or they may be carried out in separate manufacturing facilities.

Figure 6:
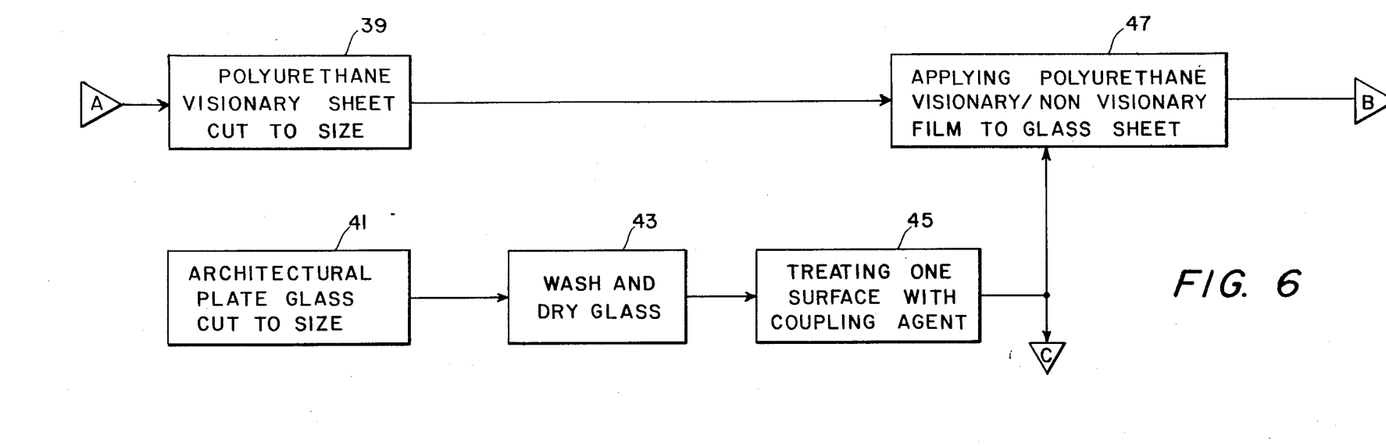
FIG. 6 is a block diagram of the lamination preparation process steps of the invention.

Polyurethane visionary or non-visionary sheet received from the shipping step 37 if needed is cut to size 39, FIG. 6. Likewise, architectural plate glass, either flat plate or spandrel glass is received and cut to size 41. For architectural or structural applications, this glass typically comes in ⅛ inch, 3/16 inch, ¼ inch and ½ inch thicknesses.

The architectural glass received is cut to size 41 and is then tempered heat strengthened glass as is usually required for commercial and industrial structural applications. The polyurethane film is produced by standard methods. This includes adding the dye or tint into a melting pot of pellets and then casting the dyed material so that the polyurethane is smooth on both sides. Likewise, the deposition of metal step utilizes electrostatic enhancement commonly known in the art.

The glass received in step 41, is cleaned with water and detergent and then air dried 43. Following this step 43, if the glass has not been tempered it undergoes a tempering and heat strengthing operation.

Next, one surface of the glass is treated with a coupling agent 45. This coupling agent 45 can be a silicone based solution, such as organosilane ester, as supplied by Union Carbide Corporation. This coupling agent 45 is ordered as product A-1100. It has a viscosity about the same as water and can be fixed with isopropyl alcohol.

Typically, the coupling agent 45 is two percent A-1100 and 98 percent isopropyl alcohol. This mixture is applied to the glass sheet in the treating step 45 while the glass sheet is held in the horizontal position. It can be applied in a temperature range from 40 to 90 degrees F., with the nominal temperature application being between 60 and 65 degrees F.

Typically, glass coming out of the wash and dry process step 43 is at approximately 85 degrees F., while the ambiant temperature of the factory would be about 65 degrees F.

Following the treating step 45, the alcohol evaporates leaving the A-1100 material on the top surface of the glass.

The polyurethane visionary or non-visionary film is then applied to the treated side of the glass sheet 47.

If the polyurethane film has a metal or metal oxide coating, or has been dyed only on the surface, this coated or dyed surface is preferably placed interfacing the glass sheet, thereby protecting it from abrasion and scratches. The opacifying surface layer can also be placed outwardly so as not to interface with the glass plate surface, as shown and discussed above in connection with FIG. 3.

Figure 7:
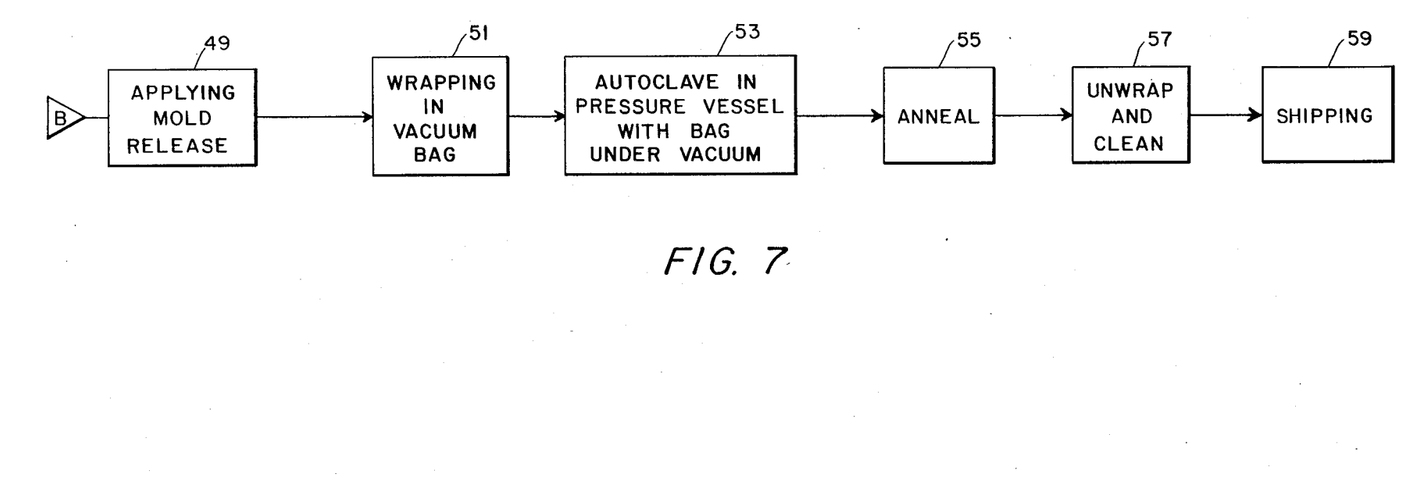
FIG. 7 is a block diagram of the lamination pressure and heat treating process steps of the invention.

The laminate produced from process step 47 then has a mold release applied 49, FIG. 7. This mold release, which can be a liquid or a film, is used because the laminate is then wrapped in a vacuum bag having been first wrapped in breather material which is used as a collector material for the resins driven off in the heat process. The mold release permits seperation after the heat process. This wrapping step 51 occurs following the application of the mold release, step 49, whereby the mold release allows the removal of the breather material and vacuum bag as it keeps the polyurethane from becoming attached to these materials.

Following the wrapping step 51, each vacuum bag is connected to a vacuum system while being placed in a pressurizable heating autoclave 53. An autoclave pressure and heat step 53 causes the polyurethane to go into a plastic state under pressure sufficient to cause a smoothing of the polyurethane against the glass plate. Either air, or a inert gas, such as nitrogen, is pumped into the autoclave pressure vessel. The pressures applied are in excess of 100 pounds per square inch.

As polyurethane becomes plastic at about 235 degrees F., the autoclave temperatures are operated at about 260 to 280 degrees F.

Following a sufficient soaking time, the laminate is then slowly cooled to below 220 degrees F. At this temperature, the process operator is assured that the polyurethane has solidified. Additional cooling is controlled to anneal 55 the laminate and to remove stresses from the glass plate. The vacuum bag is then removed from the autoclave and the vacuum bag contents removed.

Following the annealing step 55, the laminate is unwrapped from the breather material and the release material is cleaned from the laminate 57. Following this step 57, the laminate product is then ready for shipping 59.

Figure 8:
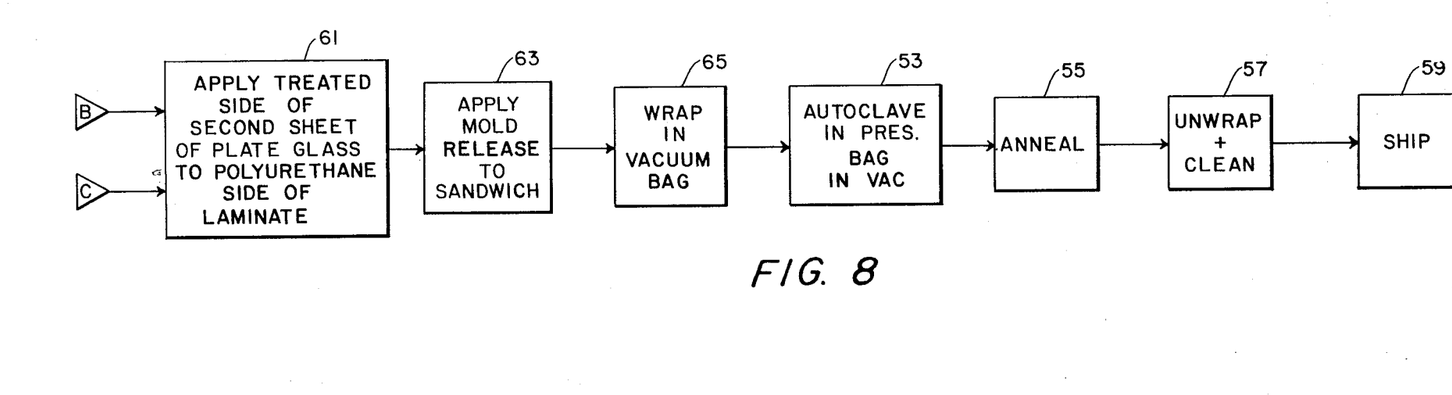
FIG. 8 is a block diagram of the equivalent process steps to those of FIG. 7; but for a sandwiching.

When glass sandwich product is manufactured, FIG. 8, a second sheet of plate glass is treated and positioned on top of the polyurethane. Thus, the second sheet of plate glass sandwiches the polyurethane between it and the first sheet of plate glass. Naturally, the second sheet of plate glass has been treated with coupling agent on it's interfacing side according to the previous process 45. This sandwiching step 61 is then followed by an application step 63 where mold release is applied to the sandwich. Following the application of mold release material, the sandwich is covered with the resin absorbing breather material and then wrapped in the vacuum bag 65. This step 65 is similar to or can be identical to the wrapping step 51 for the laminate structure.

Following the wrapping and bagging step 65, the bagged material is stacked in the autoclave pressure vessel which is an identical operation to the process steps 53 for the laminate structure. After this autoclave step 53, the sandwich material is anealed 55 and then unwrapped and cleaned 57 before being sent to shipping 59 as with the process steps for the laminate material.

The autoclave heat and temperature processing of step 53 of the laminate or sandwich in a vacuum bag can be operated according to a number of pressure, temperature and time charts.

Typically, each vacuum bag in the autoclave is under about 28½ inches of water vacuum. In a first soaking process, of FIG. 9, the autoclave temperature and pressure are gradually raised 67 until the temperature reaches 260 degrees F., FIG. 9. At this time temperature of 260 degrees F. is maintained for about 15 minutes under a static pressure of about 125 psig 69. Following this soaking time of 15 minutes, the temperature is reduced at a rate of 1 degree F. per minute over a 10 minute time period with the 125 psig pressure maintained 71. When the autoclave reaches the temperature of 250 degrees F., the cool down rate is then changed to 4 degrees per minute for 7½ minutes 73 to bring the autoclave temperature to 220 degrees F. During this time, the pressure of 125 degrees psig continues to be maintained within the autoclave.

Figure 9:
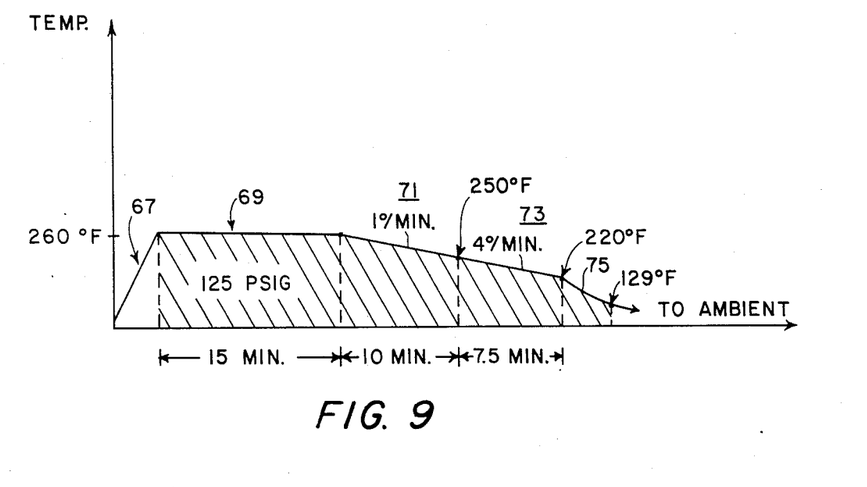
FIG. 9 is a heat and pressure treatment curve for the process.

Following the reaching of 220 degrees F., the autoclave is then allowed to cool at an ambient transfer rate to 129 degrees F. 75. Having reached this temperature of 129 degrees F., the pressure is released and the autoclave is opened. The product is then removed and allowed to cool to ambiant temperature before it is unwrapped and cleaned.

The controlled cool down from 260 degrees to 220 degrees over the 17.5 minute period provides the annealing step 55 of FIGS. 7 and 8.

Figure 10:
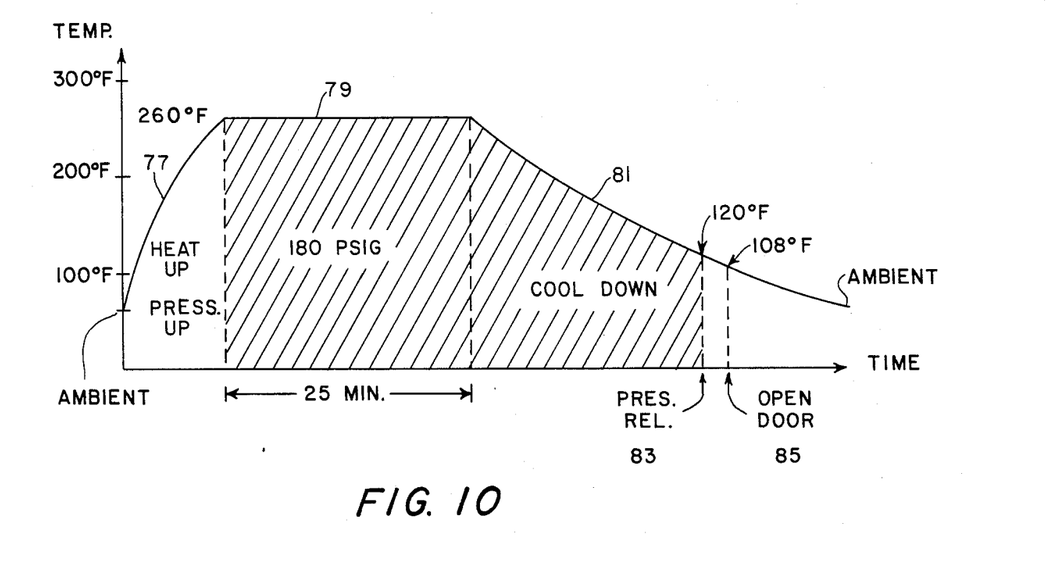
FIG. 10 is an alternate heat and pressure treatment curve for the process.

An alternative to the heat-pressure-time curve of FIG. 9 is shown in FIG. 10. Here the vacuum bags containing the laminate material or the sandwich material are placed in the autoclave and the autoclave temperature and pressure is raised 77. Each vacuum bag is held under 28½ inches of water vacuum as before. In the present soaking process, FIG. 10, the autoclave temperature is held constant at 260 degrees F. for 25 minutes 79. During this time the autoclave atmosphere is at 180 psig.

At the end of this 25 minute time period, the autoclave heating system is shut down and the interior of the autoclave is allowed to cool naturally while maintaining the pressure of 180 psig 81. When the interior of the autoclave reaches 120 degrees F. the pressure is released 83. The interior of the autoclave then continues to cool down to 108 degrees F. The door is opened 85 and the product is taken out of the autoclave an unwrapped at the ambiant shop temperature. The cool down curve 81 to 120 F. will depend upon the structure and insulation of the autoclave as well as the ambiant temperature of the shop on the day of operation. This cool down curve 81 represents the annealing step 55 of the FIGS. 7 and 8.

Figure 11:
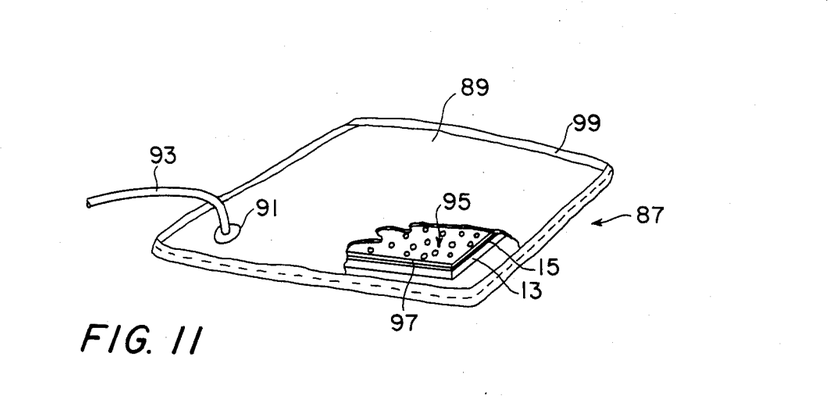
FIG. 11 illustrates a pressure bag used in the autoclave heat and pressure treatment steps.

Each laminate or sandwich is placed in an individual vacuum bag 87, FIG. 11. Each bag 87 includes a top and bottom side 89 made of silicone rubber or mylar. Reusable bags 87 are made of heavier material, while disposable bags are made of lighter material. Heavier material may be two mils or greater in thickness. Attached to one side 89 and extending therethrough is a vacuum hose coupling 91 to which a vacuum hose 93 is connected. This hose 93 is connected to a vacuum system within the autoclave and used to evacuate the bag 87. The laminate 11 comprising a sheet of glass 13 and a polyurethane film 15 is wrapped top, bottom and sides with a breather material 95. This breather material is nominally one hundred mils thick and is a resin absorber material of air weave design. It is available in the market place from Associated Industries Inc. of Wichita, Kans. and can be ordered by style N-10.

Associated Industries also supplies plastic release materials. One of their goods is a one mil thick perforated release film 97 which is wrapped around the laminate 11 prior to the wrapping with the breather material 95. This release material 97 facilitates the disassembly of the structure and keeps the polyurethane film 15 from bonding to the breather material 95. Each disposable bag 87 is sealed at it's edges with sealant tape 99 which is also available in the market place and ordered by number R-500. Tape 99 is nominally ordered in widths of from 0.50 inches to 1.25 inches from Associated Industries, Inc. The vacuum hose 93 is nominally 0.25 inches on it's inside diameter.

Figure 12:
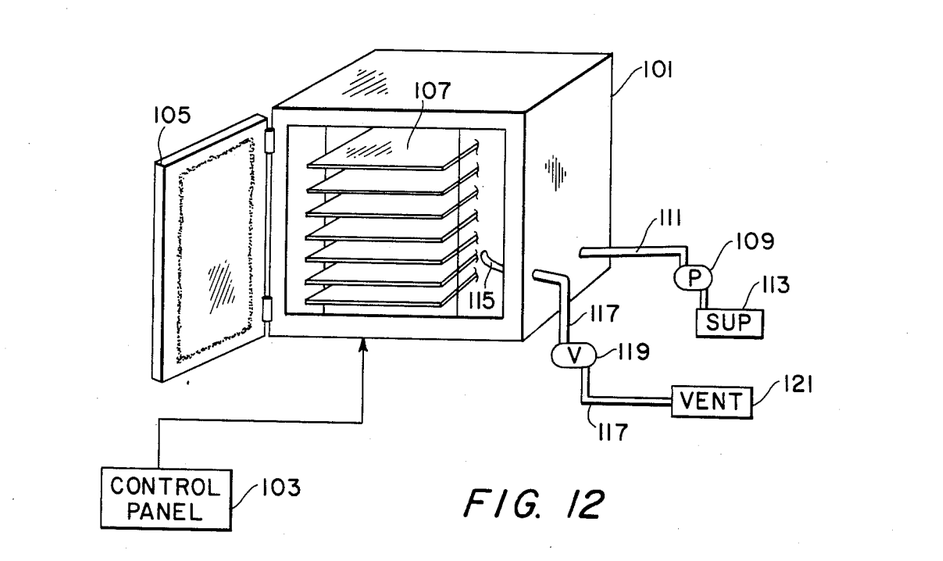
FIG. 12 illustrates an autoclave structure used in the heat and pressure treatment.

The autoclave structure 101 utilized in process step 53 is shown in FIG. 12. This autoclave structure 101 provides the heat and temperature environment for the vacuum bags 87. Likewise provided is the vacuum system 115 for connection to each vacuum line 93.

The autoclave structure 101 can be of a number of different sizes, including a room size structure 101 as provided by Melco Steel Company of Cleveland, Ohio. This autoclave structure 101 is gas fired and it includes an electronic control panel 103 for controlling the rate of heating and the temperature within the autoclave 101. The autoclave 101 gas fire controls include thermal couples positioned throughout its interior, which interior is nominally about 8 feet high and 10 feet wide and 14 feet long. The autoclave 101 has at least one access door 105. It contains a plurality of shelves or racks 107 in it's interior. The heater control panel 103 also controls the operation of a pressure pump 109 which is connected to the interior of the autoclave 101 via piping 111. This pump 109 pressurizes the interior of the autoclave 101 either with ambiant air or with inert gas from a supply 113.

Each of the vacuum hoses 93 from each of the vacuum bags 87 held on the shelves 107 is connected to a vacuum manifold 115. This vacuum manifold 115 is connected through piping 117 to a vacuum pump 119. The discharge end of the vacuum pump 119 is connected via piping 117 to a vent system 121. The vacuum pump 119 is likewise controlled from the control panel 103.

Both the pressure pump 109 system and the vacuum pump 119 system can be obtained in the market place from many suppliers including the Kinney Pump Company of Cleveland, Ohio. As an alternative to having the pressure pump 109 and the vacuum pump 119 operated and controlled from the control panel 103, the operation of these pumps 109, 119 can be set and controlled at the pump housings 109, 119 themselves.

The invention above provides a new laminate structure for opacified glass whereby colored or otherwise opacified polyurethane film is bonded to glass plate. The use of film makes material handling easier and makes the product more economical to manufacture than the direct casting of polyurethane onto glass. The pre-tinting, dying or metal oxide coating of the polyurethane film assures reproducable coloring or opacifing from various manufacturing runs.

The invention likewise provides a new visionary or non-visionary architectural glass laminate where a metal or metal oxide is first bonded to plastic film and then the film is bonded to the glass plate.

The invention likewise provides a sandwich instead of a laminate.

Also provided is a new and improved manufacturing process for manufacturing this laminate, and a vacuum bag system as well as an autoclave batch process apparatus for use in the manufacturing process.

Changes can be made in the above invention without departing from the scope and intent thereof. It is intended, therefore, that the above disclosure is to be interpreted as illustrative of the invention and not that the invention be limited to the above description.

I claim:

1. An architectural opacified glass laminate comprising:

a sheet of clear plate glass; and a sheet of opacified polyurethane film cross-linked molecularly bonded directly to one side of said glass plate without an interposed adhesive material.

2. The glass laminate of claim 1 wherein said cross-linked molecular bonding of said polyurethane sheet directly to said glass plate is aided by a coupling agent.

3. The glass laminate of claim 2 wherein said coupling agent is a member of the silane group of organoester silane, in-organic ester silane.

4. The glass laminate of claim 2 also including a second sheet of clear plate glass cross-linked molecularly bonded directly to the other side of the polyurethane film sheet without an interposed adhesive material.

5. The glass laminate of claim 1 wherein said opacified polyurethane film sheet is tinted.

6. The glass laminate of claim 1 wherein said opacified polyurethane film sheet is dyed.

7. The glass laminate of claim 6 wherein said dyed polyurethane sheet is dyed throughout.

8. The glass laminate of claim 1 wherein said opacified polyurethane film sheet is coated on one side with a metal coating.

9. The glass laminate of claim 1 wherein said opacified polyurethane film sheet is coated on one side with a metal oxide coating.

10. An architectural opacified glass laminate comprising:
    a section of glass plate; and
    a sheet of opacified plastic molecularly bonded directly to one side of said glass plate, without an interposed layer of adhesive material, said plastic sheet having a coating of metal on the outer face thereof.

11. The architectural opacified glass laminate of claim 10 wherein said glass plate is of clear glass.

12. The architectural opacified glass laminate of claim 11 wherein said metal coating is a metal oxide film.

13. The architectural opacified glass laminate of claim 10 wherein said glass plate is of opacified glass.

* * * * *

UNITED STATES PATENT AND TRADEMARK OFFICE
CERTIFICATE OF CORRECTION

PATENT NO. : 4,822,680

DATED : April 18, 1989

INVENTOR(S) : Gennaro J. Catalano, Larry D. George

It is certified that error appears in the above-identified patent and that said Letters Patent is hereby corrected as shown below:

Column 1, line 35 change "polyproplyene" to --polypropylene--;
Column 1, line 61-2 change "polycarboniates to --polycarbonates--;

Column 2, line 38 change "provided to -- provide--;
Column 2, line 42 change "polyster" to --polyester--;
Column 4, line 33 delete "the polyurethane film";
Column 4, line 51 change "agrigate" to --aggregate--;
Column 4, line 62 change "agrigate" to --aggregate--;
Column 5, line 49 change "ambiant" to --ambient--;
Column 6, line 2 change "seperation" to --separation--;
Column 6, line 14 delete "a";
Column 6, line 39 change "it's" to --its--;
Column 7, line 11 change "ambiant" to --ambient--;
Column 7, line 34 change "an" to -- and--;
Column 7, line 35 change "ambiant" to -- ambient--;
Column 7, line 37 change "ambiant" to --ambient--;
Column 8, line 23 change "ambiant" to -- ambient--;

Signed and Sealed this

Twentieth Day of November, 1990

Attest:

HARRY F. MANBECK, JR.

*Attesting Officer*    Commissioner of Patents and Trademarks